(12) United States Patent
Kamamoto et al.

(10) Patent No.: US 9,127,716 B2
(45) Date of Patent: Sep. 8, 2015

(54) BALL BEARING

(71) Applicant: JTEKT CORPORATION, Osaka-shi, Osaka (JP)

(72) Inventors: Shigeo Kamamoto, Kashiwara (JP); Junji Murata, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/273,951

(22) Filed: May 9, 2014

(65) Prior Publication Data

US 2014/0341492 A1   Nov. 20, 2014

(30) Foreign Application Priority Data

May 17, 2013   (JP) ................................. 2013-105113

(51) Int. Cl.
*F16C 33/38* (2006.01)
*F16C 33/32* (2006.01)
*F16C 19/06* (2006.01)
*F16C 33/41* (2006.01)

(52) U.S. Cl.
CPC ......... *F16C 33/3806* (2013.01); *F16C 33/3887* (2013.01); *F16C 33/416* (2013.01); *F16C 2300/22* (2013.01)

(58) Field of Classification Search
CPC .. F16C 33/416; F16C 33/418; F16C 33/3806; F16C 33/3387
USPC .......... 384/470, 516, 523, 431, 614, 625, 534
See application file for complete search history.

(56) References Cited

U.S. PATENT DOCUMENTS

| | | | | |
|---|---|---|---|---|
| 3,135,564 | A | * | 6/1964 | Agens ........................... 384/470 |
| 3,506,316 | A | * | 4/1970 | McKee ......................... 384/516 |
| 4,534,871 | A | * | 8/1985 | Johnson ........................ 508/100 |
| 4,916,751 | A | * | 4/1990 | Sumita et al. ................. 384/516 |
| 6,799,896 | B2 | * | 10/2004 | Meeker et al. ................. 384/470 |
| 2004/0211638 | A1 | * | 10/2004 | Ikeda et al. .................. 192/41 A |
| 2005/0207688 | A1 | * | 9/2005 | Dannhoff ...................... 384/523 |
| 2007/0292064 | A1 | * | 12/2007 | Fukuda ......................... 384/470 |
| 2012/0141061 | A1 | * | 6/2012 | Montboeuf et al. .......... 384/614 |

FOREIGN PATENT DOCUMENTS

| | | | | |
|---|---|---|---|---|
| EP | 2287482 A1 | * | 2/2011 | |
| GB | 545 043 A | | 5/1942 | |
| JP | S55-38021 U | | 3/1980 | |
| JP | H09-49525 A | | 2/1997 | |
| JP | 2615959 B2 | * | 6/1997 | |
| JP | 2003113843 A | * | 4/2003 | ............. F16C 33/64 |
| JP | A-2004-340277 | | 12/2004 | |
| JP | 2010090912 A | * | 4/2010 | |
| WO | WO 9309357 A1 | * | 5/1993 | ............. F16C 19/26 |
| WO | WO 03095855 A1 | * | 11/2003 | ............. F16C 33/64 |

OTHER PUBLICATIONS

Nov. 26, 2014 Search Report issued in European Patent Application No. 14 16 8088.

* cited by examiner

*Primary Examiner* — Marcus Charles
(74) *Attorney, Agent, or Firm* — Oliff PLC

(57) ABSTRACT

A cage holds a plurality of balls such that the balls are arranged at intervals in the circumferential direction. The cage is allowed to be in contact with an outer ring, and a portion of the outer ring, with which the cage is brought into contact, is only an inner periphery raceway groove. The cage is located so as to be apart from an inner ring.

13 Claims, 7 Drawing Sheets

BALL BEARING

INCORPORATION BY REFERENCE

The disclosure of Japanese Patent Application No. 2013405113 filed on May 17, 2013 including the specification, drawings and abstract is incorporated herein by reference in its entirety.

BACKGROUND OF THE INVENTION

1. Field of the Invention

The invention relates to a ball bearing.

2. Description of the Related Art

A conventional ball bearing is described in, for example, Japanese Patent Application Publication No. 2004-340277. The ball bearing includes an outer ring, an inner ring, a plurality of balls and a cage. The balls are disposed between an inner periphery raceway groove of the outer ring and an outer periphery raceway groove of the inner ring, are held by the cage, and are located at intervals in the circumferential direction.

The aforementioned cage is a snap cage having only one annular portion and a plurality of cage bars. The cage bars extend from one-side axial end portion of the annular portion toward the one side in the axial direction. The cage bars are arranged at intervals in the circumferential direction. The cage has pockets defined between the cage bars that are adjacent to each other in the circumferential direction.

The balls are disposed in the respective pockets. The distal end portions of the cage bars are curved so as to narrow openings of the pockets. Thus, the balls are prevented from coming out of the pockets toward the one side in the axial direction. The cage is disposed so as to be apart from both the outer ring and the inner ring, and is in contact with only the balls. The cage is held and guided by the balls, so that the cage is prevented from coming off the ball bearing.

In the conventional bearing, the balls need to be held by curved faces of the cage, which define the pockets, in order to prevent the balls and the cage from being separated from each other. Thus, the area of contact between the cage and the balls becomes larger, and therefore the fictional torque due to friction between the cage and the balls and the agitation torque based on agitation resistance induced in grease disposed between the cage and the balls are increased. As a result, the torque becomes larger, and the operation costs are increased.

Further, the large agitation resistance increases the degree of temperature rise, and thus the service life of the grease is shortened. Due to problems such as reduction in the service life of the grease caused by a high degree of temperature rise, the conventional ball bearings are not suitable for use with a high speed rotation.

SUMMARY OF THE INVENTION

One object of the invention is to provide a ball bearing configured such that the torque is reduced to suppress the operation costs, and able to operate at higher rotational speeds.

A ball bearing according to an aspect of the invention includes: an outer raceway member having an inner periphery raceway groove; an inner raceway member having an outer periphery raceway groove; a plurality of balls disposed between the inner periphery raceway groove of the outer raceway member and the outer periphery raceway groove of the inner raceway member; and a cage that holds the balls such that the balls are arranged at intervals in a circumferential direction of the ball bearing, that is located so as to be apart from the inner raceway member, and that is allowed to be in contact with the outer raceway member, a portion of the outer raceway member, with which the cage is brought into contact, being only the inner periphery raceway groove.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, example embodiments of the invention will be described with reference to the accompanying drawings.

Figure 1:
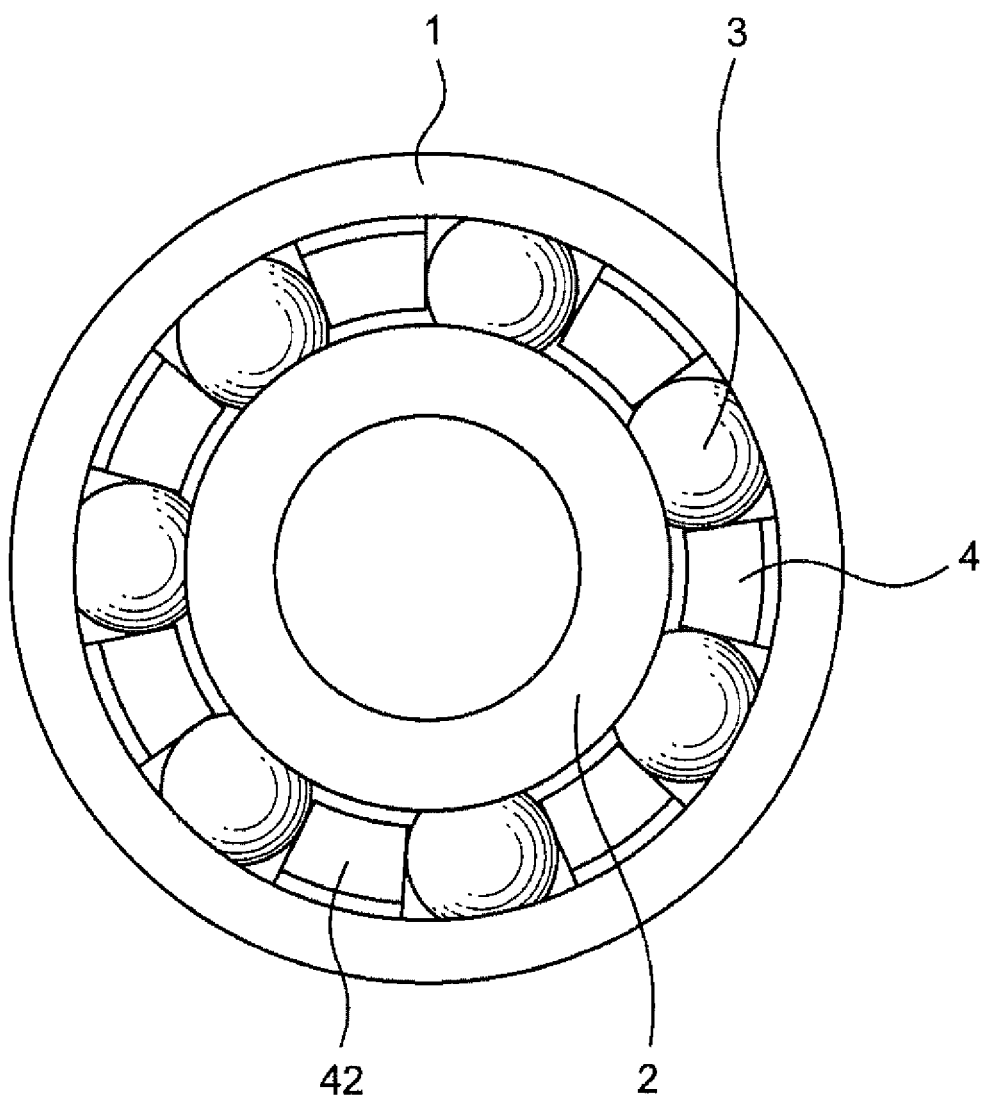
FIG. 1 is a plan view of a ball bearing according to an embodiment of the invention, as viewed from one side of the ball bearing in the axial direction.

FIG. 1 is a plan view of a ball bearing according to an embodiment of the invention, as viewed from one side of the ball bearing in the axial direction.

As illustrated in FIG. 1, the ball bearing includes an outer ring 1, which may function as an outer raceway member, an inner ring 2, which may function as an inner raceway member, a plurality of balls 3, and a cage 4. The cage 4 is a single-piece member made of resin and formed by injection molding. The balls 3 are held by the cage 4 between the outer ring 1 and the inner ring 2, and are disposed so as to be separated from each other in the circumferential direction by cage bars 42 of the cage 4.

Figure 2:
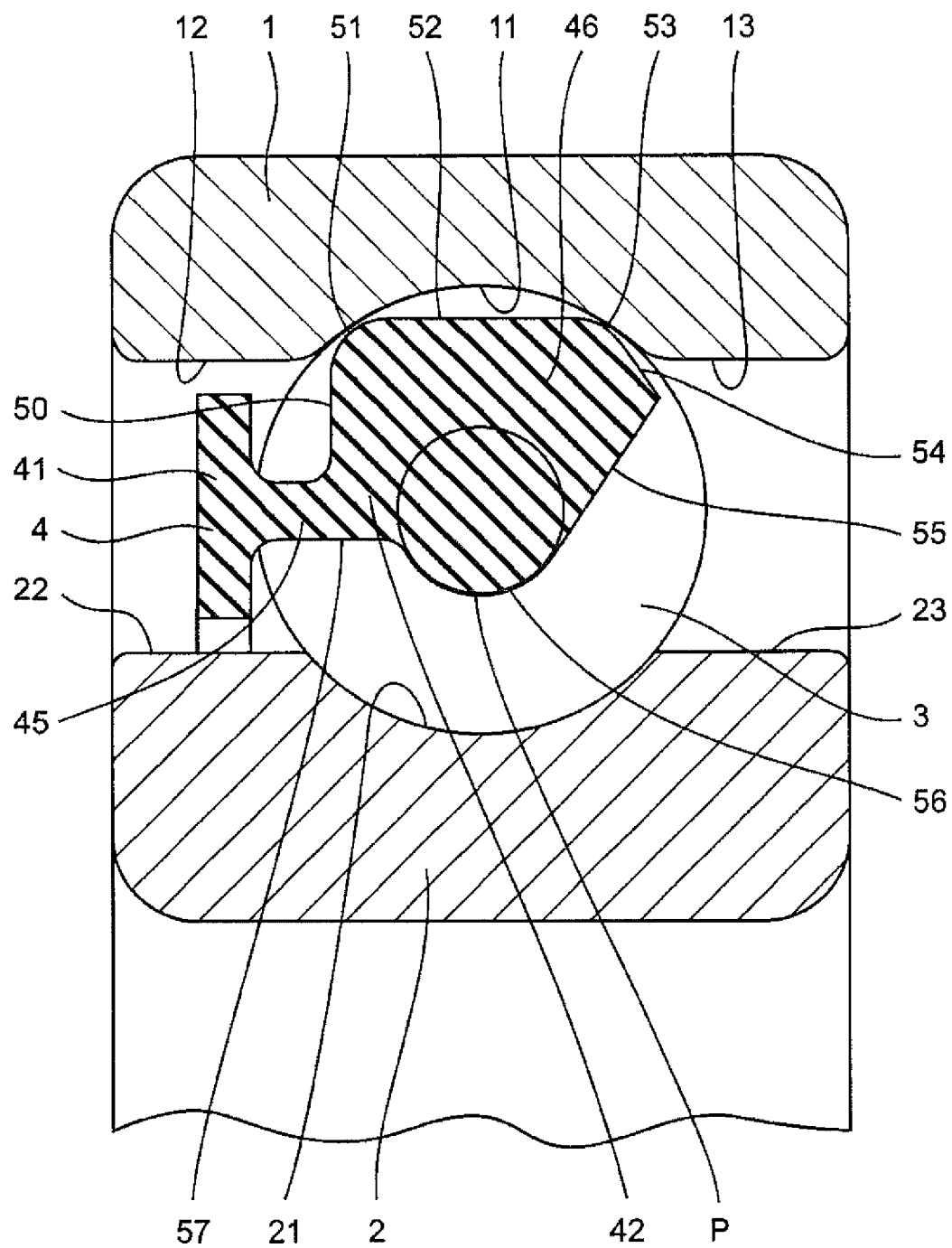
FIG. 2 is a schematic sectional view taken along a plane extending in the axial direction and passing through one of cage bars of a cage of the ball bearing.

FIG. 2 is a schematic sectional view taken along a plane extending in the axial direction and passing through one of the cage bars 42 of the cage 4 of the ball bearing.

As illustrated in FIG. 2, the outer ring 1 has an inner periphery raceway groove 11, one side groove shoulder 12 and the other side groove shoulder 13. The one side groove shoulder 12 is located on one side of the inner periphery raceway groove 11 in the axial direction. The other side groove shoulder 13 is located on the other side of the inner periphery raceway groove 11 in the axial direction. The one side groove shoulder 12 is connected to one end portion of the inner periphery raceway groove 11 on the one side in the axial direction. The other side groove shoulder 13 is connected to the other end portion of the inner periphery raceway groove 11 on the other side in the axial direction.

The inner periphery raceway groove 11 is formed through super finishing. Thus, the face roughness of the inner periphery raceway groove 11 is reduced to prolong the service life of the balls 3 that roll on the inner periphery raceway groove 11. Both the one side groove shoulder 12 and the other side groove shoulder 13 are not subjected to super finishing. The inner periphery raceway groove 11 has an arithmetic average roughness Ra that is smaller than that of an inner peripheral face of the one side groove shoulder 12, and is also smaller than that of an inner peripheral face of the other side groove shoulder 13.

Similarly, the inner ring 2 has an outer periphery raceway groove 21, one side groove shoulder 22 and the other side groove shoulder 23. The one side groove shoulder 22 is located on one side of the outer periphery raceway groove 21 in the axial direction. The other side groove shoulder 23 is located on the other side of the outer periphery raceway groove 21 in the axial direction. The one side groove shoulder 22 is connected to one end portion of the outer periphery raceway groove 21 on the one side in the axial direction. The other side groove shoulder 23 is connected to the other end portion of the outer periphery raceway groove 21 on the other side in the axial direction.

The outer periphery raceway groove 21 is formed through super finishing. Thus, the face roughness of the outer periphery raceway groove 21 is reduced to prolong the service life of the balls 3 that roll on the outer periphery raceway groove 21. Both the one side groove shoulder 22 and the other side groove shoulder 23 are not subjected to super finishing. The outer periphery raceway groove 21 has an arithmetic average roughness Ra that is substantially equal to the arithmetic average roughness Ra of the inner periphery raceway groove 11. The arithmetic average roughness Ra of the outer periphery raceway groove 21 is smaller than that of an outer peripheral face of the one side groove shoulder 22, and is also smaller than that of an outer peripheral face of the other side groove shoulder 23.

The cage 4 has only one annular portion 41 and the cage bars 42. The cage bars 42 extend from the other-side axial end portion of the annular portion 41 toward the other side in the axial direction. The cage bars 42 are arranged at intervals in the circumferential direction. As illustrated in FIG. 2, the annular portion 41 has a rectangular sectional shape, and extends in the radial direction.

Each of the cage bars 42 has a connection portion 45 and a ball holding portion 46. The ball holding portion 46 has an axial end face 50, a first corner portion 51, a radially outer end face 52, a second corner portion 53, a first tilted face 54, a second tilted face 55, a curved face 56 and a radially inner end face 57. The axial end face 50 extends in the radial direction, as viewed in a section taken along the axial direction. The radially outer end face 52 extends in the axial direction, as viewed in a section taken along the axial direction. The first corner portion 51 has a curved face, as viewed in a section taken along the axial direction. The first corner portion 51 smoothly connects the axial end face 50 and the radially outer end face 52 to each other.

The first tilted face 54 obliquely extends such that the distance between the axial end face 50 and the first tilted face 54 increases in a direction toward the inside in the radial direction, as viewed in a section taken along the axial direction. The second corner portion 53 has a curved face, as viewed in a section taken along the axial direction. The second corner portion 53 smoothly connects the radially outer end face 52 and the first tilted face 54 to each other. The second tilted face 55 is connected to the other-side axial end portion of the first tilted face 54. The second tilted face 55 obliquely extends such that the distance between the axial end face 50 and the second tilted face 55 decreases in a direction toward the inside in the radial direction, as viewed in a section taken along the axial direction.

The curved face 56 has a shape of part of a generally arc, as viewed in a section taken along the axial direction. As illustrated in FIG. 2, a circle including the arc has a radius that is approximately half the radius of the ball 3. The center of the circle generally coincides with the center of the ball 3 in the circumferential direction. The radially inner end face 57 is connected to one-side axial end portion of the curved face 56. The radially inner end face 57 extends from the one-side axial end portion of the curved face 56 toward the one side in the axial direction, as viewed in a section taken along the axial direction.

The axial end face 50 and the radially outer end face 52 are overlapped with the inner periphery raceway groove 11 in the radial direction. The cage 4 is guided by the inner periphery raceway groove 11 of the outer ring 1 only at two points, as viewed in a section taken along the axial direction. Specifically, the first corner portion 51 of the ball holding portion 46 is allowed to be in contact with the inner periphery raceway groove 11, and the second corner portion 53 of the ball holding portion 46 is also allowed to be in contact with the inner periphery raceway groove 11. As illustrated in FIG. 2, the first corner portion 51 is located on the one side of the bottom of the inner periphery raceway groove 11 in the axial direction. The second corner portion 53 is located on the other side of the bottom of the inner periphery raceway groove 11 in the axial direction. As illustrated in FIG. 2, as viewed in a section taken along the axial direction, the first corner portion 51 has a curved face that is convex toward a portion of the inner periphery raceway groove 11, with which the first corner portion 51 is brought into contact. Further, as viewed in a section taken along the axial direction, the curved face of the contact portion of the first corner portion 51 has a curvature radius, which is smaller than that of the portion of the inner periphery raceway groove 11, with which the first corner portion 51 is brought into contact. Further, as viewed in a section taken along the axial direction, the second corner portion 53 has a curved face that is convex toward a portion of the inner periphery raceway groove 11, with which the second corner portion 53 is brought into contact. Further, as viewed in a section taken along the axial direction, the curved face of the contact portion of the second corner portion 53 has a curvature radius, which is smaller than that of the portion of the inner periphery raceway groove 11, with which the second corner portion 53 is brought into contact. By setting the two guide positions for the cage 4, in the outer ring 1 as described above, the cage 4 is stably guided on the inner periphery raceway groove 11 of the outer ring 1.

The connection portion 45 connects a radially center portion of the annular portion 41 to the axial end face 50 of the ball holding portion 46. The connection portion 45 has a maximum radial thickness that is smaller than the maximum radial thickness of the ball holding portion 46. Thus, the connection portion 45 is elastically deformed easily, so that it is possible to press-fit the cage 4 in the outer ring 1.

A region of a pocket-defining side face of each cage bar 42, the region being overlapped, in the circumferential direction, with the inside region of a circle indicated by a reference character P in FIG. 2, that is, a region of the pocket-defining side face of each cage bar 42, the region being overlapped with a center portion of the ball 3 in the circumferential direction, is a flat face. The ball 3 is brought into contact with the flat face P.

Figure 3:
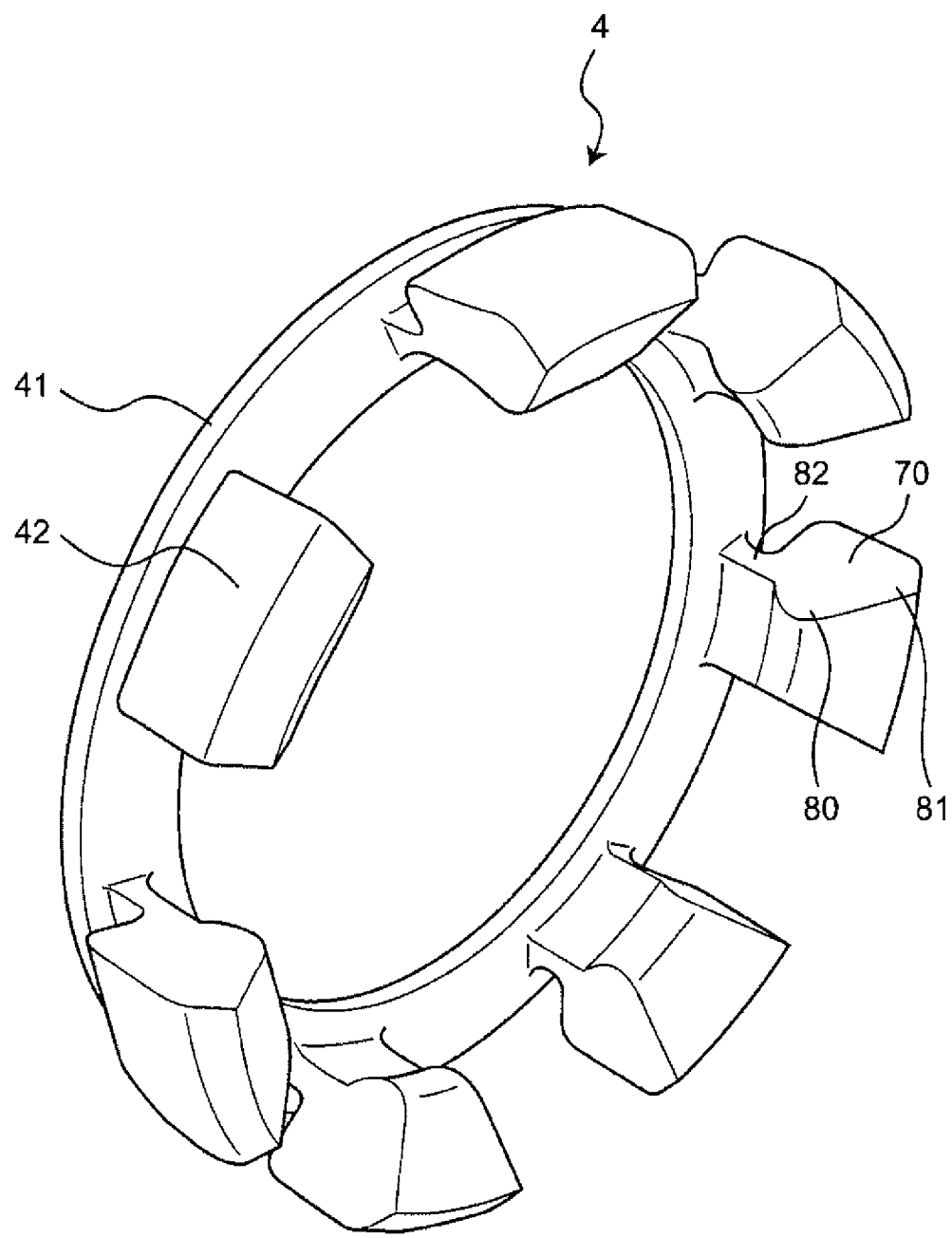
FIG. 3 is a perspective view of the cage.

FIG. 3 is a perspective view illustrating the cage 4.

As illustrated in FIG. 3, each of the cage bars 42 has a side face 70 that defines a pocket. In the side face 70, there are an end portion 80 located radially inside and apart from the annular portion 41, a portion 81 located radially outward of the end portion 80, and a portion 82 located closer to the annular portion 41 than the end portion 80 in the axial direction. The thickness of the cage bar 42 in the circumferential direction, at a position of the end portion 80, is smaller than the thickness of the cage bar 42 in the circumferential direction, at a position of the portion 81. In addition, the thickness of the cage bar 42 in the circumferential direction, at a position of the end portion 80, is smaller than the thickness of the cage bar 42 in the circumferential direction, at a position of the portion 82. Thus, it is possible to reduce the interference of the balls 3 when the cage 4 is fitted into the outer ring 1, thereby making it possible to more smoothly fit the cage 4 into the outer ring 1.

Figure 4:
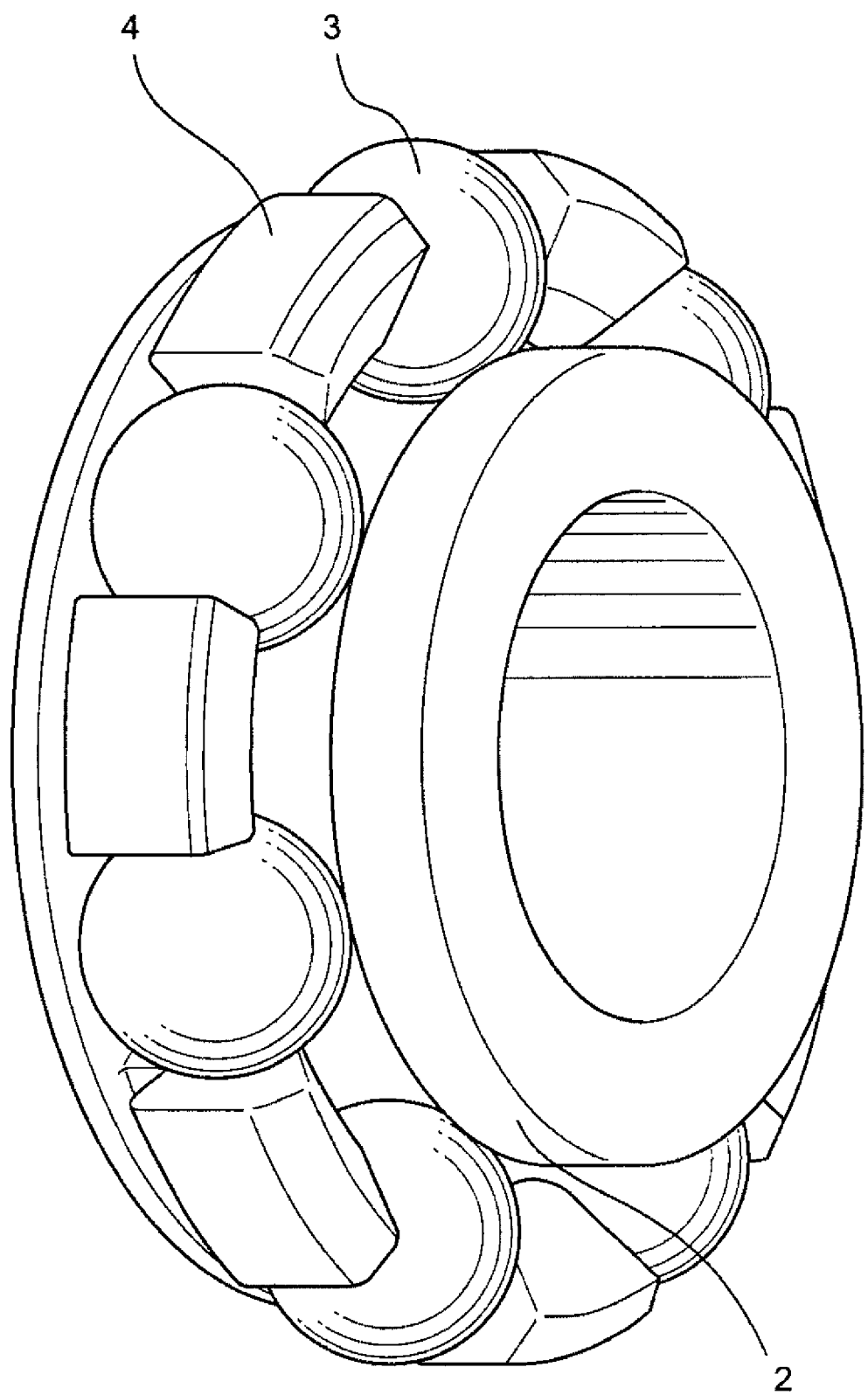
FIG. 4 is a perspective view illustrating an inner ring, balls and the cage of the ball bearing from which an outer ring is omitted.
Figure 5:
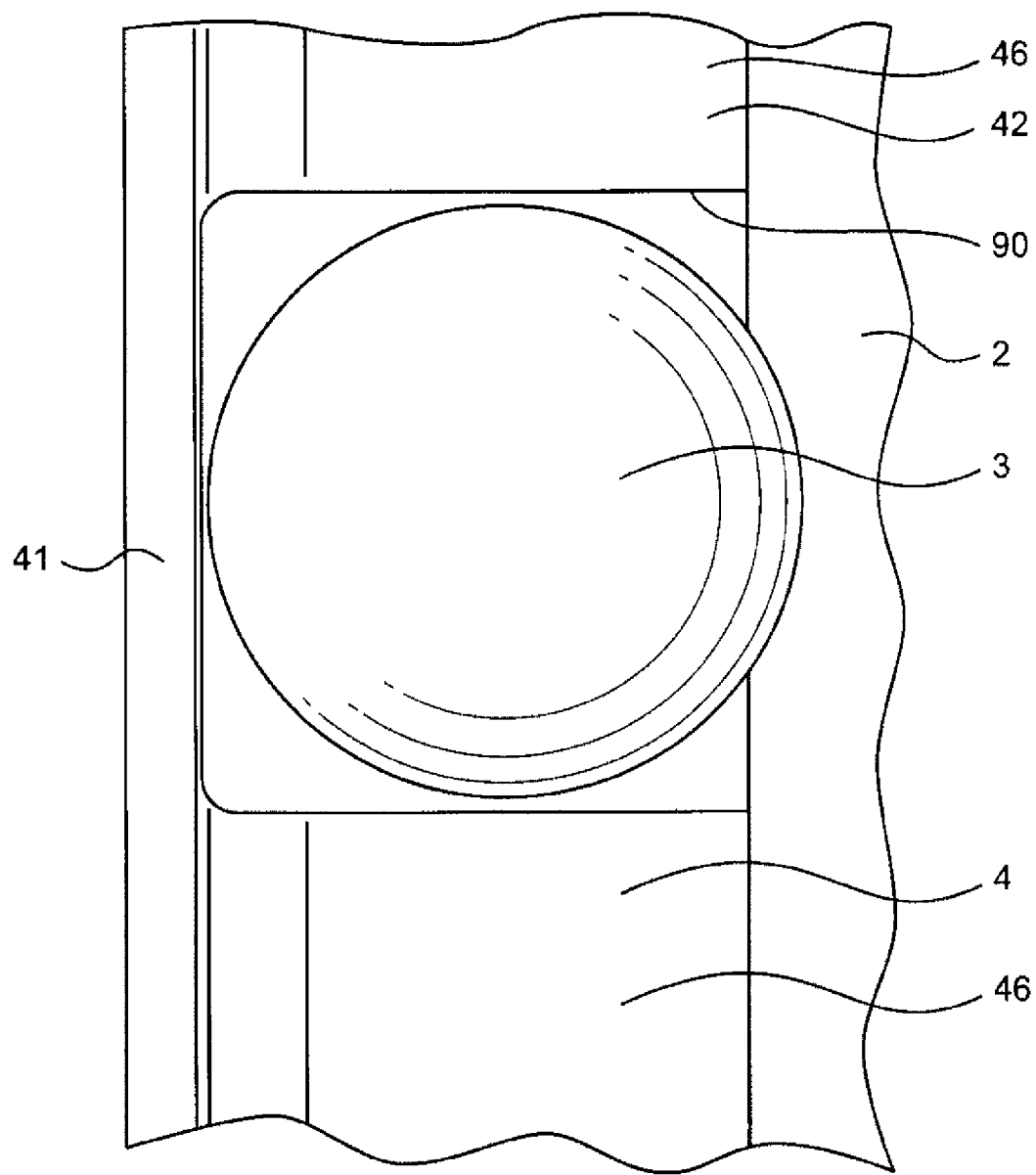
FIG. 5 is a schematic view illustrating part of the ball bearing in FIG. 4, as viewed from the outside in the radial direction.

FIG. 4 is a perspective view illustrating the inner ring 2, the balls 3 and the cage 4 of the ball bearing from which the outer ring 1 is omitted. FIG. 5 is a schematic view illustrating part of the ball bearing in FIG. 4, as viewed from the outside in the radial direction.

As illustrated in FIG. 4, the present embodiment differs from the related art in that the cage 4 is configured such that the balls 3 are not held by curved faces. As illustrated in FIG. 2 and FIG. 5, in the present embodiment, the balls 3 are disposed so as to be apart from the annular portion 41 of the cage 4. In the present embodiment, the cage 4 is guided by the inner periphery raceway groove 11 of the outer ring 1, and thus a range existing positions of the cage 4 relative to the outer ring 1 is determined. Further, the balls 3 roll on the inner periphery raceway groove 11 of the outer ring 1, and thus a range of existing positions of the balls 3 relative to the outer ring 1 is determined. Thus, it is possible to prevent the balls 3 from being brought into contact with the annular portion 41 of the cage 4.

As illustrated in FIG. 5, when the balls 3 are accommodated in the pockets 90, there is a clearance between each of the balls 3 and each of the corresponding ball holding portions 46. In the present embodiment, when the balls 3 fail to keep up with the rotation of the cage 4, each of the balls 3 is brought into contact, at only one point, with one of the two cage bars 42 that define the corresponding pocket in the cage 4. Thus, in the present embodiment, during the operation of the ball bearing, the balls 3 are placed in one of the state where each ball 3 is brought into contact, at only one point, with the cage bar 42 located on one side of the ball 3 in the circumferential direction, or the state where each ball 3 is not in contact at all with the two cage bars 42 on respective sides of the ball 3 in the circumferential direction. Thus, in the present embodiment, a larger space is ensured between the ball 3 and the ball holding portion 46, and thus a larger amount of grease is retained between the ball 3 and the ball holding portion 46. As a result, it is possible to enhance the lubricity of the ball bearing.

Figure 6:
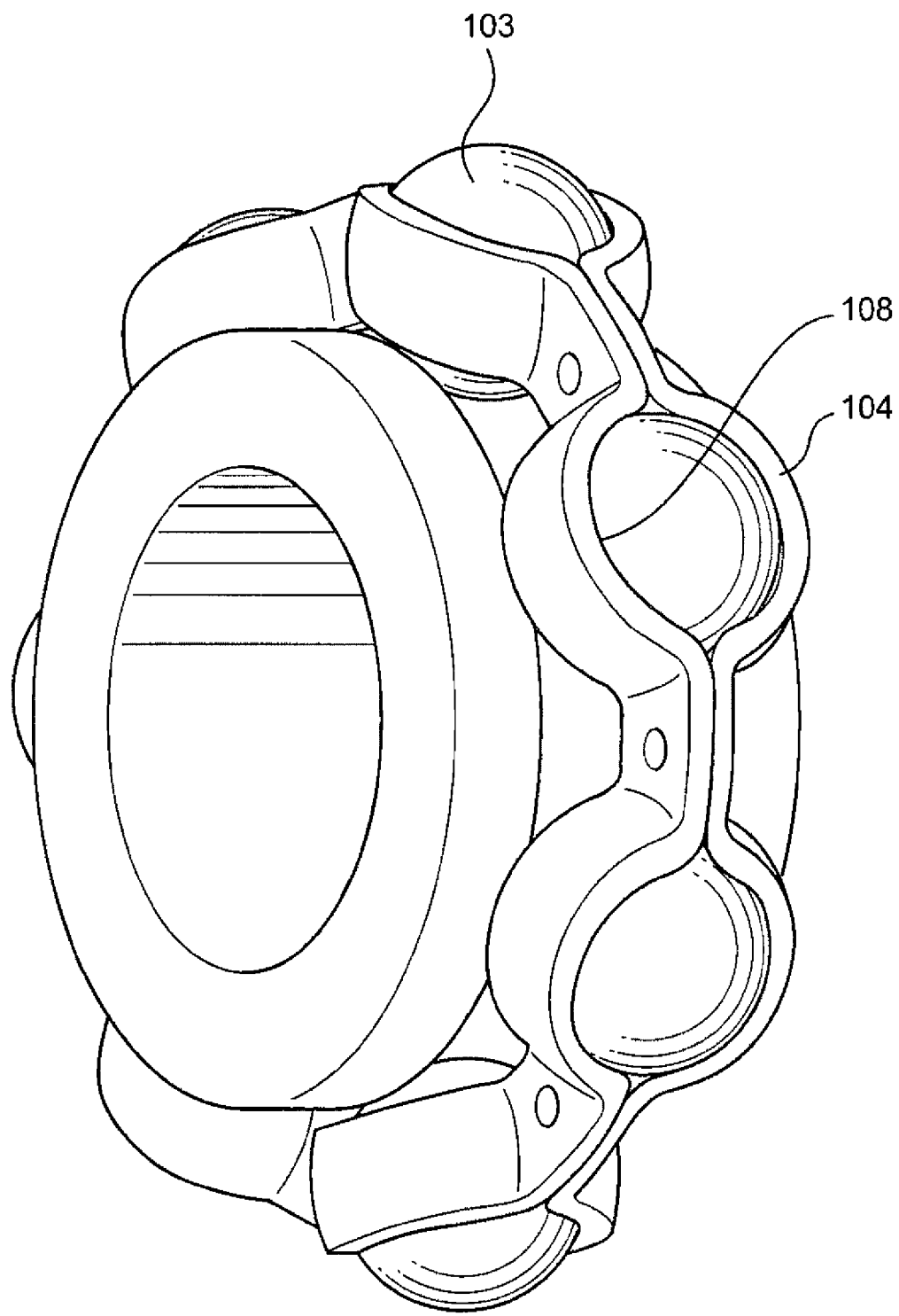
FIG. 6 is a perspective view illustrating a conventional ball bearing including a known ribbon cage (rivets are not illustrated), FIG. 6 corresponding to FIG. 4.
Figure 7:
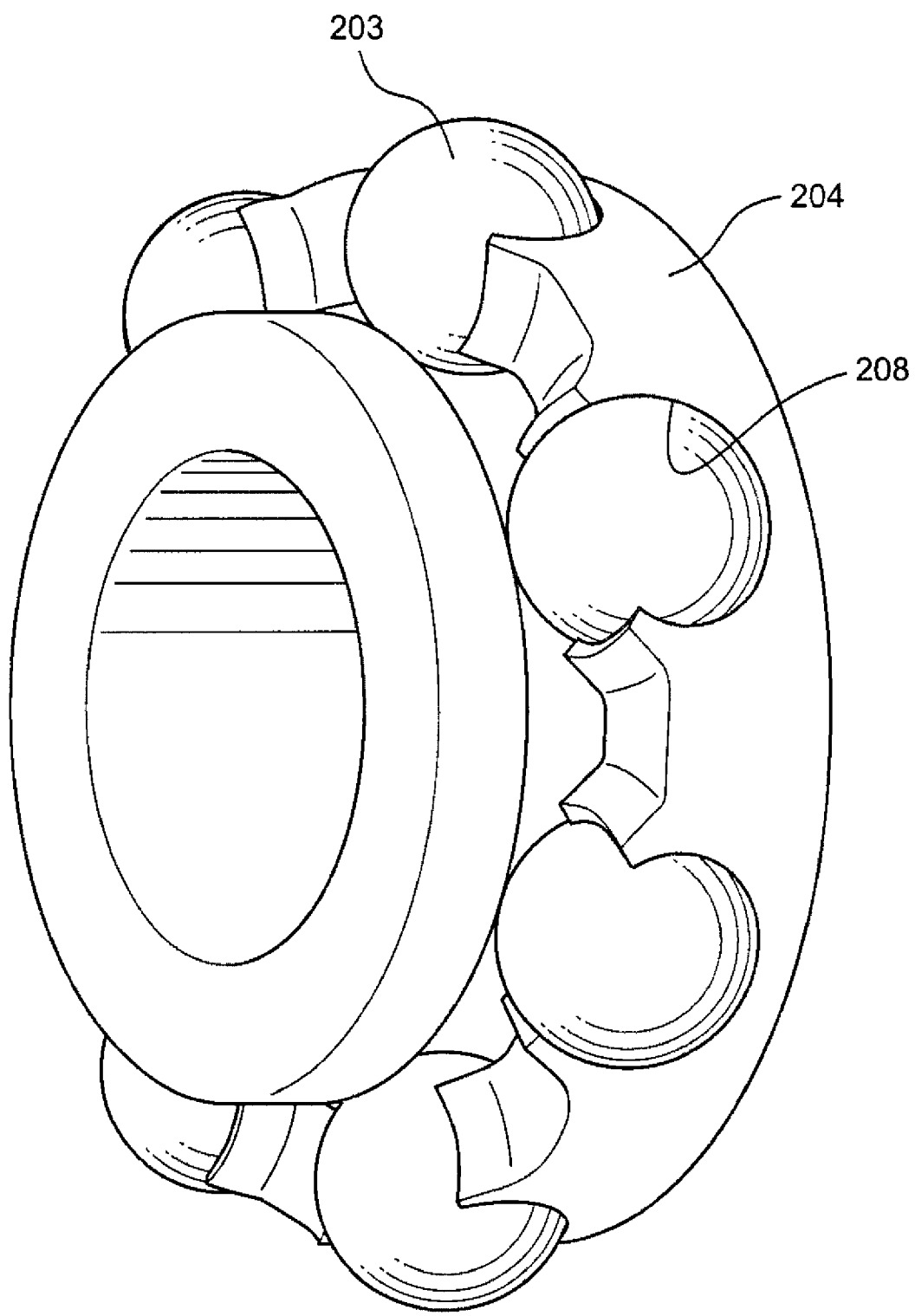
FIG. 7 is a perspective view illustrating a conventional ball bearing including a known snap cage, FIG. 7 corresponding to FIG. 4.

FIG. 6 is a perspective view illustrating a conventional ball bearing including a known ribbon cage 104 (rivets are not illustrated), FIG. 6 corresponding to FIG. 4. FIG. 7 is a perspective view illustrating a conventional ball bearing including a known snap cage 204, FIG. 7 corresponding to FIG. 4.

As illustrated in FIG. 6 an FIG. 7, in the conventional ball bearings, the cages 104, 204 have generally spherical faces 108, 208 corresponding to outer peripheral faces of balls 103, 203, respectively. The generally spherical faces 108, 208 hold the balls 103, 203 so as to retain the balls 103, 203. On the other hand, as illustrated in FIG. 4 and FIG. 5, in the ball bearing according to the present embodiment, each of the balls 3 is brought into contact with the cage 4 at only one point. Thus, the area of contact between the balls 3 and the cage 4 in the ball bearing according to the present embodiment is significantly smaller than the area of contact between the balls and the cage in each of the conventional ball bearings illustrated in FIG. 6 and FIG. 7.

In the above-described embodiment, because the cage 4 is allowed to be in contact with the inner periphery raceway groove 11 of the outer ring 1, the cage 4 is guided by the inner periphery raceway groove 11 of the outer ring 1. Therefore, it is not necessary to guide the cage 4 with the balls 3. Thus, it is not necessary to prevent the balls 3 from coming off the cage 4. As a result, it is not necessary to ensure a contact area required to bring the cage 4 and the balls 3 into one unit body by using the contact between the cage 4 and the balls 3. Thus, the area of contact between the cage 4 and the balls 3 is decreased, and the clearances between the cage 4 and the balls 3 are increased. Therefore, it is possible to reduce the fictional torque due to friction between the cage 4 and the balls 3 and the agitation torque based on agitation resistance induced in the grease disposed between the cage 4 and the balls 3. Thus, the required amount of lubricant is reduced, and thus the operation costs are reduced. Further, the agitation resistance is reduced, and thus a temperature rise is suppressed. Thus, it is possible to prolong the service life of the lubricant. Further, the temperature rise is suppressed, and thus deterioration of the lubricant is suppressed. As a result, the ball bearing is allowed to be used with a higher speed rotation.

According to the above-described embodiment, the portion of each of the cage bars 42 of the cage 4, with which the ball 3 is brought into contact, is a flat face. Thus, the area of contact between the cage 4 and the ball 3 is significantly reduced. Thus, it is possible to greatly reduce the torque, thereby further prolonging the service life of the lubricant and allowing the ball bearing to be used with a higher speed rotation.

According to the above-described embodiment, because the balls 3 are not in contact with the annular portion 41, the area of contact between the cage 4 and the balls 3 is significantly reduced. In view of this, it is possible to greatly reduce the torque, thereby further prolonging the service life of the lubricant and allowing the ball bearing to be used with a higher speed rotation.

According to the above-described embodiment, because each of the balls 3 is brought into contact with the cage bar 42 at only one point, the contact torque is greatly reduced, and as well, the agitation torque is greatly reduced. Thus, it is possible to greatly reduce the torque as a whole. Because deterioration of the lubricant is suppressed greatly, it is possible to allow the ball bearing to be used with a higher speed rotation.

According to the above-described embodiment, as viewed in a section passing through the cage bar 42 of the cage 4 and taken along the axial direction, the cage bar 42 is guided, at two points, by the inner periphery raceway groove 11 of the outer ring 1. Thus, the cage 4 is stably guided by the inner periphery raceway groove 11 of the outer ring 1. As a result, it is possible to stabilize the behavior of the cage 4.

According to the above-described embodiment, the cage 4 is guided by the inner periphery raceway groove 11 of the outer ring 1. Because it is necessary to prolong the service life of the balls 3 to prolong the service life of the ball bearing, the inner periphery raceway groove 11 of the outer ring 1 is usually subjected to grinding finishing such as super finishing. That is, the inner periphery raceway groove 11 is subjected to grinding finishing anyway. Therefore, the purpose of the grinding finishing is not only to allow the cage 4 to be guided by the inner periphery raceway groove 11 but also to prolong the service life of the balls 3.

On the other hand, in a configuration in which a cage is guided by shoulders of an inner periphery raceway groove, it is necessary to grind inner peripheral faces of the shoulders only for the purpose of allowing the cage to be guided by the shoulders to prolong the service life of the cage.

According to the above-described embodiment, the cage 4 is guided by the inner periphery raceway groove 11 of the outer ring 1. Thus, it is no longer necessary to grind the inner peripheral faces of the shoulders of the inner periphery raceway groove 11 of the outer ring 1 with a high degree of dimensional accuracy. Therefore, the manufacturing cost of the ball bearing according to the above-described embodiment is lower than that of the ball bearing in which the cage is guided by the shoulders of the inner periphery raceway groove. As a result, it is possible to suitably use the ball bearing according to the above-described embodiment, for example, in home electric appliances for which considerable cost reduction is demanded.

In the above-described embodiment, the ball bearing is a deep groove ball bearing having the raceway grooves 11, 21 that are deep grooves. However, the ball bearing according to the invention may be an angular contact ball bearing having a counter bore. Further, at least one of the inner periphery raceway groove and the outer periphery raceway groove may be an angular contact-type raceway groove. Further, the ball bearing according to the invention may be ball bearings other than a deep groove ball bearing and an angular contact ball bearing.

In the above-described embodiment, each of the balls 3 is apart from the annular portion 41 of the cage 4. However, in the invention, each ball 3 may be in contact with the annular portion 41 of the cage 4 at one point, for example.

In the above-described embodiment, the arithmetic average roughness Ra of the inner periphery raceway groove 11 of the outer ring 1 is smaller than that of the inner peripheral faces of the shoulders 12, 13 of the inner periphery raceway groove 11 of the outer ring 1. However, in the invention, the arithmetic average roughness Ra of the inner periphery raceway groove 11 of the outer ring 1 may be substantially equal to that of the inner peripheral faces of the shoulders 12, 13 of the inner periphery raceway groove 11 of the outer ring 1. Similarly, in the above-described embodiment, the arithmetic average roughness Ra of the outer periphery raceway groove 21 of the inner ring 2 is smaller than that of the outer peripheral faces of the shoulders 22, 23 of the outer periphery raceway groove 21 of the inner ring 2. However, in the invention, the arithmetic average roughness Ra of the outer periphery raceway groove 21 of the inner ring 2 may be substantially equal to that of the outer peripheral faces of the shoulders 22, 23 of the outer periphery raceway groove 21 of the inner ring 2.

In the above-described embodiment, in a section taken along the axial direction and passing through the cage bar 42, the cage 4 is held at two points by the inner periphery raceway groove 11 of the outer ring 1, that is, the cage 4 is allowed to be in contact with the inner periphery raceway groove 11 of the outer ring 1. However, in the invention, in a section taken along the axial direction and passing through the cage bar 42, the cage 4 is held by the inner periphery raceway groove 11 of the outer ring 1 at one point, at three or more points, or at a surface.

In the above-described embodiment, the portion of each of the cage bars 42, with which the ball 3 is brought into contact, is a flat face. However, in the invention, the portion of each of the cage bars 42, with which the ball 3 is brought into contact, may be a concave face or a convex face.

In the above-described embodiment, each of the balls 3 is brought into contact with the cage bar 42 at only one point. However, in the invention, each of the balls 3 may be brought into contact with the cage bar 42 at two or more points or at a surface. It is needless to say that it is preferable that each ball is brought into point contact with the cage bar rather than being brought into surface contact with the cage bar in view of reduction of the contact torque and the agitation torque. Further, it is needless to say that it is most preferable that each ball is brought into contact with the cage bar at only one point in view of reduction of the contact torque and the agitation torque.

In the above-described embodiment, the cage 4 is made of resin. However, in the invention, the cage 4 may be made of metal. In this case, a portion of the cage bar, with which the ball is brought into contact, is preferably subjected to super grinding finishing.

In the above-described embodiment, the outer raceway member is the outer ring 1. However, in the invention, the outer raceway member may be an intermediate ring. In the above-described embodiment, the inner raceway member is the inner ring 2. However, in the invention, the inner raceway member may be an intermediate ring or a shaft member having a non-annular shape.

In the above-described embodiment, the raceway grooves 11, 21 are subjected to super finishing. However, in the invention, the raceway grooves may be subjected to any known grindings other than super finishing.

In the above-described embodiment, the flat portion of the cage bar, with which the ball 3 is brought into contact, has a circular edge. However, in the invention, when the portion of the cage bar, with which the ball is brought into contact, is a flat face, the flat portion may have a polygonal edge or an elliptical edge, that is, the flat portion may have an edge with any closed (looped) line shape.

In the above-described embodiment, each ball 3 is brought into contact with only the cage bar 42 on one of the sides in the circumferential direction. However, in the invention, each ball may be brought into contact with the cage bars on both sides in the circumferential direction. In view of smooth rolling of the balls, it is needless to say that each ball is preferably brought into contact with only the cage bar on one of the sides in the circumferential direction.

In the above-described embodiment, the circumferential thickness of the end portion 80 of each cage bar 42 in is smaller than that of the other portion of the cage bar 42 to make it easier to fit the cage 4 to the outer ring 1. That is, the circumferential thickness of the cage bar 42 is varied from position to position in the cage bar 42. However, in the invention, the circumferential thickness of each cage bar may be set substantially uniform regardless of a position in the cage bar 42, or the circumferential thickness of each cage bar may be varied in any manner. In the invention, a recess such as a cutout may be formed as needed to lower the stiffness of the cage, so that the degree of elastic deformation of the cage is increased. Thus, it is possible to enhance the efficiency of assembly of the cage. For example, a recess may be formed in each cage bar of the cage, at a position near a portion of the cage bar, which is connected to the annular portion.

In the above-described embodiment, each cage bar 42 has the axial end face 50, the first corner portion 51, the radially outer end face 52, the second corner portion 53, the first tilted face 54, the second tilted face 55, the curved face 56 and the radially inner end face 57. In a section taken along the axial direction and passing through the cage bar 42, the cage bar 42 has a complicated shape, as illustrated in FIG. 2. However, in the invention, in a section taken along the axial direction of the ball bearing and passing through each cage bar, the cage bar may have any shapes such as a triangular shape, a square shape, a rectangular shape, another quadrangular shape such as a trapezoidal shape, polygonal shapes such as a pentagonal shape, a semicircular shape, a shape obtained by combining straight lines and ellipses, a shape obtained by combining straight lines and curves other than ellipses, and a shape composed of only curves. In the invention, in a section taken along the axial direction of the ball bearing and passing through each cage bar, the cage bar may have any shape as long as the cage is guided only by the inner periphery raceway groove of the outer ring. Preferably, each cage bar has such a shape that the cage bar is allowed to be brought into contact with the inner periphery raceway groove of the outer ring only at two points. In the case where each cage bar is configured to be brought into contact with the inner periphery raceway groove of the outer ring at two points, the positions at which the cage bar is allowed to be in contact with the outer ring need not coincide with each other in the radial direction, and may be offset from each other in the radial direction unlike the configuration illustrated in FIG. 2.

In the invention, the balls and the raceway groove may be brought into contact with each other in any manner. For example, the balls and the raceway groove may be brought into contact with each other at two points, at three points or at four points. Further, it is needless to say that the balls and the raceway groove may be brought into contact with each in any known manner (for example, surface contact).

According to the invention, it is possible to provide the ball bearing configured such that the torque is reduced to suppress the operation costs, and able to operate at higher rotational speeds.

What is claimed is:

1. A ball bearing comprising:
an outer raceway member having an inner periphery raceway groove;
an inner raceway member having an outer periphery raceway groove;
a plurality of balls disposed between the inner periphery raceway groove of the outer raceway member and the outer periphery raceway groove of the inner raceway member; and
a cage that holds the balls such that the balls are arranged at intervals in a circumferential direction of the ball bearing, that is located so as to be apart from the inner raceway member, and that is allowed to be in contact with the outer raceway member, a portion of the outer raceway member, with which the cage is brought into contact, being only the inner periphery raceway groove, wherein
each of cage bars of the cage is guided by the inner periphery raceway groove of the outer raceway member at two points, in a section taken along an axial direction of the ball bearing and passing through the cage bar.

2. The ball bearing according to claim 1, wherein:
the cage has only one annular portion and a plurality of cage bars extending from one-side axial end portion of the annular portion toward one side in an axial direction of the ball bearing and arranged at intervals in the circumferential direction;
the cage has pockets defined between the cage bars adjacent to each other in the circumferential direction, and the balls are disposed in the pockets; and
a portion of each of the cage bars, to which a corresponding one of the balls is brought into contact, is a flat face.

3. The ball bearing according to claim 2, wherein:
the cage has only one annular portion and a plurality of cage bars extending from one-side axial end portion of the annular portion toward one side in an axial direction of the ball bearing and arranged at intervals in the circumferential direction;
the cage has pockets defined between the cage bars adjacent to each other in the circumferential direction, and the balls are disposed in the pockets; and
the balls are located so as to be apart from the annular portion.

4. The ball bearing according to claim 3, wherein:
a shoulder continuous with the inner periphery raceway groove is formed in an inner peripheral face of the outer raceway member, on at least one side of the inner periphery raceway groove in an axial direction of the ball bearing; and
an arithmetic average roughness Ra of an inner peripheral face of the shoulder is larger than an arithmetic average roughness Ra of the inner periphery raceway groove.

5. The ball bearing according to claim 2, wherein each of the balls is brought into contact with a corresponding one of cage bars at only one point.

6. The ball bearing according to claim 5, wherein:
a shoulder continuous with the inner periphery raceway groove is formed in an inner peripheral face of the outer raceway member, on at least one side of the inner periphery raceway groove in an axial direction of the ball bearing; and
an arithmetic average roughness Ra of an inner peripheral face of the shoulder is larger than an arithmetic average roughness Ra of the inner periphery raceway groove.

7. The ball bearing according to claim 2, wherein:
a shoulder continuous with the inner periphery raceway groove is formed in an inner peripheral face of the outer raceway member, on at least one side of the inner periphery raceway groove in an axial direction of the ball bearing; and
an arithmetic average roughness Ra of an inner peripheral face of the shoulder is larger than an arithmetic average roughness Ra of the inner periphery raceway groove.

8. The ball bearing according to claim 1, wherein:
the cage has only one annular portion and a plurality of cage bars extending from one-side axial end portion of the annular portion toward one side in an axial direction of the ball bearing and arranged at intervals in the circumferential direction;
the cage has pockets defined between the cage bars adjacent to each other in the circumferential direction, and the balls are disposed in the pockets; and
the balls are located so as to be apart from the annular portion.

9. The ball bearing according to any claim 8, wherein each of the balls is brought into contact with a corresponding one of cage bars at only one point.

10. The ball bearing according to claim 8, wherein:
a shoulder continuous with the inner periphery raceway groove is formed in an inner peripheral face of the outer raceway member, on at least one side of the inner periphery raceway groove in an axial direction of the ball bearing; and
an arithmetic average roughness Ra of an inner peripheral face of the shoulder is larger than an arithmetic average roughness Ra of the inner periphery raceway groove.

11. The ball bearing according to claim 1, wherein each of the balls is brought into contact with a corresponding one of cage bars at only one point.

12. The ball bearing according to claim 11, wherein:
a shoulder continuous with the inner periphery raceway groove is formed in an inner peripheral face of the outer raceway member, on at least one side of the inner periphery raceway groove in an axial direction of the ball bearing; and
an arithmetic average roughness Ra of an inner peripheral face of the shoulder is larger than an arithmetic average roughness Ra of the inner periphery raceway groove.

13. The ball bearing according to claim 1, wherein:
a shoulder continuous with the inner periphery raceway groove is formed in an inner peripheral face of the outer raceway member, on at least one side of the inner periphery raceway groove in an axial direction of the ball bearing; and
an arithmetic average roughness Ra of an inner peripheral face of the shoulder is larger than an arithmetic average roughness Ra of the inner periphery raceway groove.

\* \* \* \* \*